United States Patent [19]

Barham, Jr. et al.

[11] 4,208,433

[45] Jun. 17, 1980

[54] METHOD FOR THE ADSORPTION OF SOLIDS BY WHOLE SEEDS

[76] Inventors: Harold N. Barham, Jr., 3025 46th St., Lubbock, Tex. 79413; Harold N. Barham, deceased, late of Lubbock, Tex.; by Doris Barham, heir, 3025 46th St., Lubbock, Tex. 79413

[21] Appl. No.: 907,834

[22] Filed: May 19, 1978

Related U.S. Application Data

[63] Continuation-in-part of Ser. No. 532,757, Dec. 16, 1974, abandoned, which is a continuation of Ser. No. 287,105, Sep. 7, 1972, abandoned.

[51] Int. Cl.$^2$ ............................................... A23K 1/22
[52] U.S. Cl. ........................................ 426/69; 426/73; 426/74; 426/93; 426/72; 426/293; 426/309; 426/629; 426/630; 426/632; 426/634; 426/807
[58] Field of Search ............... 426/2, 74, 93, 289, 426/293, 309, 629, 630, 632, 634, 72, 73, 807; 47/57.6, DIG. 9; 71/77

[56] References Cited

U.S. PATENT DOCUMENTS

| | | | |
|---|---|---|---|
| 1,997,083 | 4/1935 | Robison | 426/629 |
| 2,322,516 | 6/1943 | Horvath | 426/634 |
| 3,155,521 | 11/1964 | Ward et al. | 426/74 |
| 3,642,489 | 2/1972 | Bartley | 426/807 |
| 3,806,613 | 4/1974 | Carroll et al. | 426/73 |

*Primary Examiner*—William F. Smith
*Attorney, Agent, or Firm*—Sheridan, Ross, Fields & McIntosh

[57] ABSTRACT

A method for sorption of solids by the tissues of whole seeds to enhance the available nutritional value of the whole seeds, to provide nutritional requirements for a ruminant feed, to provide new superimposed processes, to make more effective present superimposed processes, to provide innoculation with viable organisms, to provide means to reduce explosion hazzards from grain dust, and other advantages accruing from encapsulation of solids, the method comprising contacting the whole seeds with a synergetic mixture of solid materials and an oleaginous vehicle and maintaining contact until the synergetic mixture has been sorbed by the grain.

42 Claims, No Drawings

METHOD FOR THE ADSORPTION OF SOLIDS BY WHOLE SEEDS

CROSS-REFERENCES TO RELATED APPLICATIONS

This application is a continuation-in-part of U.S. patent application Ser. No. 532,757 filed Dec. 16, 1974, abandoned which is in turn a continuation application of U.S. Ser. No. 287,105 filed Sept. 7, 1972, abandoned.

SUMMARY OF THE INVENTION

This invention relates to a method to incorporate solid materials into whole seeds to alter their nutritive content, or to encapsulate chemicals within the berry tissues preparatory to subsequent and superimposed processes, or both. The present invention especially relates to a process to incorporate solids into whole seeds to enhance their nutritive values for food and feed purposes, and to enhance personnel and property safety in grain handling.

BACKGROUND OF THE INVENTION

The physical nature of seeds, and particularly whole cereal grain kernels, involves both polar and non-polar areas in which an imbalance of vector forces produce a metastable condition such that the net forces attempt to reach maximum stability. Such a state is the result of the complex component polymers and the interrlationship of those polymers which comprise the various seed tissues. Because of its presence in large proportion, the starch-protein-hemicellulose matrix of the endosperm is highly relevant to the metastable state of the seed. Comprised mostly of starch granules, the filamentous and globular protein and, to a lesser extent the cellulose polymers, sharply inhibit such polymeric availability.

Virtually every single use for such seeds must, of necessity, attempt to cope with the physical nature involving the metastable conditions therein. As a result, practically all processes pertinent to the utilization of grain seeds involve physical reduction of the seed as the only possibility for seed tissue availability. For animal feeding, comminution in the form of grinding, rolling, crimping, and the like, is common, a fundamental function of which is to provide smaller particles for mixing with other mixed feed constituents, for stability of such mixes, and tissue availability.

For whole seed uses, other than food or feed, coping with the inhibiting seed tissue interrelationships is generally more serious. Fashioning products always involves comminution in the simplest of concepts, and usually crude tissue fractionation is involved as is the case for the dry milling of wheat, corn and grain sorghum. Where complete tissue or polymer fractionation is mandatory, such as in the wet milling of corn, the seeds are processed in whole grain form preparatory to subsequent hydraulic and gravitational separations.

Steeping processes, such as in corn wet milling, involve whole grain treatment by aqueous chemical systems. The highly polar molecules of water, for example, may permeate the seed pericarp with subsequent adsorption in the internal polar regions of the seed. Although the rate of adsorption is relatively rapid upon initial water exposure, the rate diminishes rapidly until saturation is reached, the saturation point being dependent upon the extent and specific variation of structuralization of the individual seed, but whose saturation is relatively low in any case.

Limitations on water imbibition are further complicated by the variable, but sharply limited, ability of chemicals to penetrate the seed endosperm. At best, steepants in low concentrations, and including oxidizing, reducing, hydrolytic and swelling agents, vary in penetration due to nonuniform adsorption and swelling. High concentrations of chemicals in aqueous solutions exhibit even less efficacy due to rapid swelling which precludes further chemical adsorption. Furthermore, total chemical adsorption, regardless of non-uniformity and other factors, is further restricted by the relatively low amount of water which may be adsorbed. Sodium chloride, for example, may be adsorbed by the whole kernel to a modest extent, the maximum of which may be sharply defined, but that amount is adsorbed by the pericarp only and may be readily desorbed and removed by simple aqueous elutriation. Urea, on the other hand, may be adsorbed by contact with an aqueous solution, but the problems encountered obviate any possible economic processing. For example, mixing whole cereal kernels with a concentrated urea solution containing 10 percent urea (based on the grain dry weight), results in an extremely sticky mixture. Even with frequent agitation the condition of the mixture, not unlike a mixture of grain and very heavy molasses, persists for long periods of time, rendering the prospect for commercial utilization completely unacceptable.

A well known function of urea is the softening of cellulose, a major component in seed pericarps, and is used extensively in the paper industry for that purpose. It is apparent that softening of seed pericarps is at least partially accountable for the untenable handling characteristics caused by the urea solution mixed with the whole seeds.

Prospective solvents, other then water, have practically no value whatever because of the difficulty in subsequent removal of those lacking in feed or food utility and because of lack of solubility of solutes in those solvents which might be acceptable. Nonpolar compounds may or may not be adsorbed by whole seeds, depending upon molecular size and other characteristics peculiar to molecular configurations. Fats, oils and greases, regardless of source, are not adsorbed in significant quantities, if at all, and, if adsorbed, tend to migrate toward nonpolar areas of the seed tissues.

From the aforegoing it can be seen that the list of possible solvents in present processes can be narrowed, for all practical purposes, to only one, water, and selected chemicals limited to those which are soluble in water. Utility is further restricted by the numerous limitations set forth above. Completely eliminated from prospective use are an enormous number of solids which otherwise would be very useful as an integral part of the plant seed. With that apparently overwhelming limitation removed, a host of new processes, together with substantially improved present processes, would become available for markedly improved utilization of plant seeds, and particularly for cereal grains.

Total worldwide grain utilization is prodigious by any standard. In economically developed countries the animal feed manufacturing and feed grain trading industries are very large and are totally related. Additionally, corporate manufacturers of various chemical additives such as minerals, drugs, vitamins, hormones, and the like, contribute significantly to the total size of the industry. Moreover, the industry is growing, with indications that it will continue to grow, perhaps at an accelerated rate. Further contribution to industry growth has been from increased efficiencies resulting from greatly expanded feeding operations and increased delineation of nutrition requirements. Attendant to increased efficiencies have been new methods with new problems, presenting opportunities for solutions.

Feed grains form the base for all high energy animal rations by providing the only universally desirable and economic source of energy. Most of the energy is furnished by the starch, comprising about 70 percent of the "as is" moisture grain, and, to a lesser extent, from the protein, fat and fiber. However, cereal grains, like other individual feed ingredients, virtually never satisfy all the nutritive requirements for any animal type, which is further complicated by animal age and purpose (meat, eggs, milk, reproduction, and the like). Nonetheless, it is believed that cereal grains satisfy more of the requirements than any other single ingredient type. In the present state of the art, there is no known method which is satisfactory for incorporation of additives into whole cereal kernels.

It is well known that the cereal grains contain vitamins, minerals and other necessary nutrients, but those are usually present in small quantities, unsatisfactory proportions for various purposes, and are variable according to locality, year of crop production and other factors of influence. Aside from the inhibitory starch-protein relationship, the protein content of the two principal feed grains, corn and grain sorghum, are deficient in both protein quantity (eight to ten percent) and quality. Correction for a deficiency of the essential amino acid lysine, for example, has been attempted by corn plant breeders at considerable expense and effort. It is believed that success has been very modest and certain other desirable factors have been lost in the plant breeding processes. However, such an effort to correct only one deficiency points to the economic importance already placed on improved nutritional value of seeds. The utility of a method to sorb solid and oleaginous nutrients in highly variable amounts and combinations for a multitude of objectives would be immediately obvious to those skilled in the art.

Considering the limitations noted for whole grain accessibility and flexibility required for mixed feed manufacture, a necessary procedure for manufacturing of feedstuffs involves the comminution of grains, as stated above, prior to mixing together all the constituents. Such mixing procedure requires care to ensure uniform distribution of all ingredients, usually numerous, especially the microingredients. A significant portion of mixed feeds, perhaps 65 to 75 percent, are pelleted to prevent ingredient stratification and separation, thus theoretically ensuring a complete feed in each pellet. Also hopefully remedied by such procedure is the tendency of some fed birds to select ingredients from a mash. However, such mixing prior to pelleting seldom results in perfect distribution. Moreover, even optimum distribution, as afforded by conventional mixing equipment, cannot possibly ensure uniform distribution and availability in the context of fine structure availability of the grain particles therein. A significant improvement over the present art, and an obvious expedient, would be a simple, rapid and unusually economic method for encapsulation of those added nutrients in the berry itself to take advantage of the natural "pellet" (cereal kernel) provided, and which would ensure nutrient uniformity and availability and which would preclude possible component separation.

The ability of ruminant animals to utilize non-protein nitrogen (NPN) compounds in place of about one-third of the total protein requirements has been known for about 100 years. Urea, by far is the most commonly used NPN compound used for this purpose, is readily hydrolyzed to ammonia in the rumen, which, in turn, is readily utilized by the operative rumen microflora to multiply, thus producing protein for the fed ruminant animal. The newly generated cells pass from the rumen to subsequent digestive organs where the cells are digested and from which are finally assimilated by the animal. Incentive to use urea as a replacement for protein is high due to the disparity between urea and oilseed prices, with the latter usually costing seven to ten times as much as the former, on a nitrogen basis. Urea and other NPN compound usage have reached very significant levels in spite of the hazards involved, and are expected to reach notably higher levels if attendant problems can be overcome.

To be really effective economically, and to avoid dangers involved, NPN compounds must be administered with the highest uniformity possible. Restrictions inherent in the use of NPN compounds are availability to the fed animal, segregation in mixed animal feed rations, toxicity, palatability, and efficient conversion to protein, all of which are interdependent. Particle segregation occurs due to mixtures of particles which are highly dissimilar in size and shape. Portions of rations are not palatable when containing a high proportion of NPN. Furthermore, once in the rumen, urea is rapidly hydrolyzed to ammonia which may pass through the rumen walls to the animal blood stream. Toxicity results when the bloodstream ammonia concentration exceeds its threshold, which may result in death. Only by exercising considerable care in maintaining uniformity and acceptable availability rate can urea be effectively utilized. To those skilled in the art an obvious improvement over the present art would be the encapsulation and internal sorption of NPN compounds to ensure uniform distribution and which would be available to the fed animal at a rate approximating the availability of the cereal seed tissues.

Processes have been devised for the intimate association of cereal grain component tissues with urea to fashion products which yield about the same total nitrogen content as high-protein oilseed meals. One such process involves the comminution of grain, incorporation of urea and water, then simultaneous heating and extrusion. With total power requirements high, and throughput low, the manufacturing costs have not been satisfactory. Aside from such deficiencies, the effort clearly illustrates the desirable objectives by those individuals associated with the ruminant animal feeding industry. Process heating, however, causes a substantial portion of the urea to be condensed with the starch in the grain tissues, aiding materially in retarding the rate of release of urea, a requirement for a product replacing a protein concentrate. An improvement over the present state of the art would be the sorption or encapsulation of solids in high percentage to form concentrations of NPN compounds, other nutrients, or both, with concurrent retarded rate of availability of such chemicals to parallel the rate of availability of the cereal tissues.

Uniform sorption by the grain of solid chemicals would provide new and novel processes for whole seed utilization in foods, feeds and industrial applications, heretofore unavailable. For example, the placement of enzymes within the whole seed for the purpose of reducing or eliminating interrelated tissue inhibitions, would increase tissue availability. Proteolytic enzymes encapsulated in seed endosperm could be caused to degrade the protein matrix under appropriate superimposed moisture and temperature conditions, all in situ. By reducing the inhibitory starch-protein matrix, the general availability of both tissues would be enhanced to the fed animal or in subsequent procedures for wet or dry tissue separation. Similarly, amylolytic enzymes could be used to "partially digest" starch, an advantage to the fed animal, and especially to the young animal.

A method for uniform encapsulation of reactive chemicals into seed endosperm, which when subjected to superimposed subsequent processes, such as infrared heat or steam under pressure, to produce special products, would have obvious utility. Beans, for example, could be caused to sorb reactive but nutritive chemicals, then caused to react in situ to produce an endosperm with reduced structure. Such legume seeds might be cooked in less time and digested with less stress, an obvious improvement over the present art. A number of other processes, predicated upon seeeds appropriately treated chemically, would be available for the first time. Even such bizarre objectives as negative nutrition, appropriate for the demise of unsuspecting rodents or other damaging vermin, would be practical.

A method for encapsulation of seed dust into the seeds from which it issues would have a huge economic utility. It is well known that the removal of most "foreign matter" from grain is easily accomplished by various means common in the grain industry. However, the smaller the particles, the greater the difficulty in removal and handling. According to most authorities, such as the USDA and universities, the prevailing evidence shows that the fine particles, known as "dust", are usually present in seed commodities in rather small quantities. Wheat, for example, normally contains about 0.05 percent of dust, and up to one percent in extreme and rare cases. It is this fraction, however, which is the really dangerous element regarding explosions, fires, and health hazards (breathing dust and microorganism spores), and this fraction contributes to air polution, grain-weight losses, dust disposal, and other problems. Special utility would issue from a method for encapsulation of such particles in seeds and whose efficiency is in reverse proportion to the particle size, exhibiting extreme efficiency for the most minute particles.

OBJECTIVES OF THE INVENTION

It is therefore an object of this invention to provide a method to encapsulate or sorb solid chemicals within the seed which provides for heretofore unavailable utilitarian superimposed procedural steps to produce useful products.

Another object of this invention is to provide a method to chemically enhance the nutritive value of seeds for food and feed purposes.

It is a further objective of this invention to provide a method for sorption of chemicals in superabundant quantities to manufacture products such as high urea or feed supplements.

Still another objective of this invention is to provide a method whereby a large number of solid materials may be simultaneously absorbed by whole seed tissues.

Yet another objective of this invention is to provide a method for seed sorption of solids which exhibits unusual speed, simplicity and economy.

It is a further objective of this invention to provide a method for encapsulation of catalytic solids into cereal endosperm which may react in situ under appropriate conditions to provide new and useful products, and which may be used to enhance existing processes to produce products presently available.

Yet another objective of this invention is to provide a method to place useful water insoluble chemicals uniformly in whole seed tissues.

Still another objective of this invention is the incorporation of solid nutrients in the whole seed which precludes premature removal of such solids and which ensures uniformity and uniform availability to the fed animal.

A further objective is to provide a method for the control of seed dust by encapsulation into parent seeds to enhance property safety, the well being of individuals involved in grain handling, reduce air emissions, and enhance the appearance of merchandised commodities.

Other and further objectives will be apparent from the examples and explanations which follow.

STATEMENT OF THE INVENTION

The attainment of the aforegoing objectives, features, and advantages is based on the surprising discovery that solids, in the presence of oleaginous liquids or semi-solids, result in the very rapid sorption of both phases. As pointed out, oils, fats and greases of animal, vegetable and mineral origin are sorbed by the grain sparingly by the seeds, if at all. With the exception of extremely reactive solid chemicals, which react with seed tissues in the presence of even the low normal water content, solids are not accepted by the whole seed in measurable quantities and usually not at all. In aqueous solutions containing chemicals which are soluble, reaction, or "loading", at sorption sites occurs, which prevents further adsorption. Thus, the unexpectedness of the oil-solids relationship is very apparent.

DISCUSSION OF THE INVENTION

All oils, fats and greases of all sources are applicable to the process. Such oleaginous compounds are hereinafter referred to as a "vehicle" or "carrier" and may consist of combinations of various oils, fats or greases from all sources. Although there are no limitations, the oils, fats and greases with relatively higher melting ranges, or higher aggregate molecular weight or other pertinent configurations, are usually more efficient vehicles, but such differences are small. Choice of vehicles for commercial application will center around the relative costs and intended usage. For instance, the use of animal fat, including products of widely varying physical and chemical characteristics, has been a frequent choice because of nutritional value and price, a factor of considerable importance for uses of very high tonnage and rigid economic perimeters. The oleaginous material may be a non-edible type such as an inexpensive petroleum type oil for use in a synergetic mixture with a solid chemical such as borax, useful to produce an oil well drilling adjunct by means of a steaming process superimposed on the treated grain.

It is believed that the mesomorphic state, or "liquid crystal" concept, may be at least a partial explanation for the synergetic phenomenon. Neither the solids nor the vehicle has the capability of responding to the unbalanced forces within the seeds, but together the solids and vehicle move rapidly into the seeds. Thus, the behavior of the mixture is distinctly different from the separate components. It is believed that the metastable state of the seed, resulting from an imbalance of vector forces caused by the polar and nonpolar areas of the structure, and attendant attempt to reach maximum stability, are responsible. Pertinent to the phenomenon is the fact that in every case the sorption of the two-phase system of oil and solids was significantly more rapid and extensive than simple adsorption of water. Furthermore, the size and shape of the solid crystals preclude an explanation based on particle size because of the size of very large polymers and the relatively large crystals of solids with low molecular weights which are easily sorbed. By no means is solubility a factor because the majority of the solids are not soluble in fats and oils and some are barely soluble in any frequently used solvent. Chemical reaction is not a factor and does not occur. In the "liquid crystal" concept, crystals may change size and shape but continue to exhibit some of the properties of solid crystals such as birefringence to polarized light.

The ratios of weight of solids to vehicle vary and are influenced by several factors, although such variance is usually low. As stated, particle size must be such that the synergetic effect is attained. Generally, the particle size of the solids used has been that which would pass through a U.S. Wire No. 60, or would pass through an aperture of 250 microns. However, particles of some solids used have been larger than 250 microns in at least one dimension. Individual solids affect the synergetic relationship of vehicle to solids, as well as the particular mixture of solids. The relationship of solids to vehicle is usually from 1:1 to 6:1, with 4.5;1 a common ratio. It is readily apparent that the relatively low amount of vehicle required in the relationship obviates solubility as a criterion.

Almost unlimited flexibility of operation is incorporated into the process. In commercial application the proper ratio of solid(s) to vehicle to be incorporated will be known and will be dependent on the factors listed above. However, if the amount of carrier is deficient most of the solids will be carried into the whole seeds rapidly but with some of the solids remaining on the seed pericarp. The remaining vehicle requirement may be added later when convenient with results substantially the same as if it had been added together. Likewise, more solids may be added if a surplus of vehicle has been used in the first addition. More probably, various batches of processed whole seeds would be mixed together in a manner which would ensure the proper amounts of the vehicle and solids incorporated. When the synergetic two-phase system is properly balanced quantitatively, neither the solids nor the vehicle are present on the seed peripheries when sorption is complete, and as much as about 35 percent of such a mixture has been sorbed, based on the dry weight of the whole seed. Even the grain dust, always accompanying country-run grain, is incorporated, leaving only large debris such as sticks, straws, stones, known as "foreign matter" (f.m.), and other particles too large to be adsorbed. Moreover, the apparatus used for mixing the grain with the mixture components becomes clean, lacking evidence of either of the added physical phases.

Obviously, the use of any water in any form precludes the two-phase synergetic mixture of oleaginous vehicle and solids relationship because of the numerous reasons set forth in the preceeding text. The use of dilute mineral oil-in-water emulsions, as revealed by Moen, et al (U.S. Pat. No. 2,515,026, 1952), is completely inappropriate and inoperable in the present process. Use of an emulsion would dissolve any water soluble solids to preclude their adsorption in crystalline form, and certainly prevent in-depth adsorption at all. While the Moen procedure may result in "reduction in the amount of dust collected" from wheat, as compared to glycerine and molasses, its general application is sharply limited. Large quantities of dust would require the use of large quantities of water, an inoperative fraction. Modern seed harvesting procedures are responsible for the harvest of high moisture seeds, such as with corn, resulting in moisture already much too high for safe storage. Moreover, the addition of water to grain in the various channels of grain handling and merchandising (grain processing excepted) is prohibited by law in the U.S.A.

Flexibility, simplicity, and the very high rate of sorption of the synergetic mixture are factors inherent in the process and which lend the process to treatment of enormous quantities of seeds at extremely low cost. Accurate liquid and solids metering device, mixers, screw conveyors, and the like, are readily available. Many grain storage facilities have such equipment in operation or could quickly and economically acquire such devices. The aforegoing advantages are imperative in such high volume business areas, including preparation of legumes and cereals for feed and food purposes.

In the present procedure, seeds may be treated with a variety of possible vehicles to suit the intended purposes and virtually eliminate grain dust hazards at the same time. Corn, for example, may be treated with corn oil to adsorb corn dust. Likewise, soybeans could be treated with soya oil. Oils are commonly extracted from these seeds and purity of such oils produced from treated seeds could be preserved if desired. Where seeds are to be used for animal feeds, a choice might well be one with the best combination of nutrition and economy. Besides elimination of dust emissions, seed handling operators may retain the weights of dust otherwise lost or collected, as well as retention of the very small weight of the vehicle added.

As used herein, the term "seeds" refers to all cereal and legume seeds and includes barley, corn, grain sorghum, millet, oats, rice, rye, triticale, wheat and soybeans, peanuts, various edible beans, and others in these categories. The term "whole seed" means seeds which are essentially whole, whether previously processed or raw. It also includes seeds of a single type or mixed types, varieties, hybrids, and the like. The process is particularly applicable to whole seeds due to the unusual and obvious utility. All of the examples were carried out with whole seeds, including the usual amount of chaff, broken kernels and other debris, in order to illustrate the efficacy of incorporation of chemicals without the necessity of comminution.

The term "sorption" includes adsorption and absorption, or both, and is used interchangeably with "incorporation" or "encapsulation", including variations thereof. The term "solids" includes mixtures of solids.

The process is effective on seeds of widely varying moisture content and is therefore not restricted to any particular moisture content or range. Generally, seeds with natural moisture content are used because of the practicality, readily apparent. Occasionally, the moisture content may be increased either before or after the sorption of solids when unusually large amounts of solids are to be sorbed, or to cause or facilitate subsequent reactions, or both. Seeds containing saturation moisture have been shown to be efficacious to the process, if there is no water on the seed surfaces. Even so, the attraction by the seeds for the synergetic mixture is so strong water may be rejected from the grain to accommodate adsorption of the synergetic mixture. However, adsorption of the synergetic mixture into substantially dehydrated seeds has shown the phenomenon to be largely independent on the incident moisture level. An obvious expedient is usage of the prevailing physical conditions whatever they may be.

ILLUSTRATIVE EMBODIMENTS OF THE INVENTION

The following specific examples are given to illustrate various features of the present invention and are not to be regarded as limitations thereof, countless variations of which are possible within the scope of the invention.

In each of the examples listed, the seeds were weighed into a glass jar, followed by weighed additions of components of the synergetic mixture, the jar hermetically sealed by a screw-type metal lid, then shaken. By such procedure, the sorption of the synergetic mixture could be observed visually. Moreover, since the metal lid and glass jar could not possibly adsorb the mixture, it was obvious that the mixture was sorbed by the whole seeds. In addition to visual observation and measured weights, three of the examples were measured for total nitrogen. Such additional proof was actually more of a check on analytical procedure than on proof of sorption.

Treated whole seeds in many of the examples were selected at random and cut in two, both laterally and longitudinally. Kernel structures, thus exposed, could be visually examined to ascertain uniformity of endosperm, as compared to seeds from the same lot before treatment. The endosperm of the principal feed grains are almost always nonuniform, with a portion of the endosperm "corneous" or "vitrious" and the remainder "floury", usually white. An increase in uniformity toward homogeneity is known to provide increased tissue availability for the ultimate use. In no instance were any of the solids or vehicle so introduced in visual evidence in the sectioned seeds. The sorption of large quantities of salt or urea, for example, tended to mask the taste of the solids so introduced.

In the table listing the examples, all weights are in grams and percentages based on the seed dry weight. Numbers in parentheses indicate the order of applications. Figures after the vehicle, water or solids used, indicate the time lapsed after the next previous addition, with letters such as "m", "h" and "d" indicating minutes, hours and days. Small letters preceding listings refer to footnotes. The observed maximum time for disappearance is, by no means, an accurate figure since visual observation is approximate and difficult when seeds are in motion. Usually, the times listed are greater than those actually occurring. Protein contents were determined by analyzing the nitrogen content by the standard Kjeldahl method, then the nitrogen content was multiplied by a factor of 6.25 and reported as protein or equivalent protein content, a standard procedure in the animal feeding industry.

EXAMPLES

| Example Number | Seed Used Amt. & Mst. | Liquid Vehicle Used, Order and Amount (wt. & %) | Solid(s) Used, Order, and Amt. (wt. & %) | Max. Obs. Time, Disappearance of Vehicle & Solids | H₂O Added, Order and New Mst. (%) | Subsequent Treatment, if any |
|---|---|---|---|---|---|---|
| 1 | Grain Sorghum 153.1g @ 12.9% | (2) Corn oil (2m) 0.3g (0.225%) | (1) NaCl 1.3g (1.00%) | 30 seconds | | |
| 2 | Grain Sorghum 153.1g @ 12.9% | (1) Animal fat 0.3g (0.225%) | (2) NaCl (5m) 1.3g (1.00%) | 15 seconds | | Exposure to infrared heat - 30 sec. |
| 3 | Grain Sorghum 153.1g @ 12.9% | (1,3) Anise oil 0.5g (0.375%) (3-6h) | (2) NaCl (5m) 1.3 g (1.00%) | (2) 10 seconds (3) 10 seconds | | |
| 4 | Grain Sorghum 153.1g @ 12.9% | (1) Olive oil 0.3g (0.225%) | (2) NaCl (5m) 1.3g (1.00%) | 15 seconds | | |
| 5 | Grain Sorghum 153.1g @ 12.9% | (1) Oleomargarine 0.3g (0.225%) | (2) NaCl (5m) 1.3g (1.00%) | 15 seconds | | Exposure to infrared heat - 30 sec. |
| 6 | Grain Sorghum 153.1g @ 12.9% | (1) Mineral oil 0.3g (0.225%) | (2) NaCl (5m) 1.3g (1.00%) | 15 seconds | | |
| 7 | Grain Sorghum 153.1g @ 12.9% | (1) White petroleum jelly 0.3g (0.225%) | (2) NaCl (5m) 1.3g (1.00%) | 15 seconds | | |
| 8 | Grain Sorghum 153.1g @ 12.9% | (1) Peanut oil 0.6g (0.450%) | (2) NaCl (5m) 2.6g (2.00%) | 15 seconds | | |
| 9 | Grain Sorghum 153.1g @ 12.9% | (1) Coconut oil 0.7g (0.525%) | (2) NaCl (5m) 2.6g (2.00%) | 15 seconds | | |
| 10 | Grain Sorghum 146.6g @ 9.05% | (1) Mineral oil 0.2g (0.150%) | (2) NaOH (3m) 1.0g (0.750%) | 15 seconds | | |
| 11 | Grain Sorghum 153.1g @ 12.9% | (1,3) Corn oil 0.4g (0.300%) | (2) Sulfur (5m) 1.3g (1.00%) | 15 seconds | | |
| 12 | Grain Sorghum 153.1g @ 12.9% | (1) Corn oil 0.3g (0.225%) | (2) Sucrose (5m) 1.3g (1.00%) | 15 seconds | | Exposure to infrared heat - 30 sec. |
| 13 | Grain Sorghum 153.1g @ 12.9% | (1) Corn oil 0.4g (0.300%) | (2) Na(HCOO) (5m) 1.3g (1.00%) | 15 seconds | | Exposure to infrared heat - 30 sec. |
| 14 | Corn 151.0g @ 11.7% | (1) Corn oil 0.3g (0.225%) | (2) CaO (5m) 0.4g (0.300%) | 15 seconds | | Exposure to infrared heat - 30 sec. |
| 15 | Grain Sorghum 153.1g @ 12.9% | (1,3,4) Corn oil 0.5g (0.375%) (3-2h) (4-4h) | (2) Lysine . HCl (2m) 1.3g (1.00%) | (2) 15 seconds (3) 5 seconds (4) 3 seconds | | |
| 16 | Grain Sorghum 153.1g @ 12.9% | (2) Corn oil (16h) 0.4g (0.300%) | (3) NaCl (5m) 1.3g (1.00%) | 15 seconds | (1) 14.6g (20.5%) | |
| 17 | Grain Sorghum 153.1g @ 12.9% | (1,3) Corn oil 0.5g (0.375%) | (2) Casein (5m) 1.3g (1.00%) | 45-60 seconds | | |

EXAMPLES-continued

| | | | | | | |
|---|---|---|---|---|---|---|
| 18 | Grain Sorghum 153.1g @ 12.9% | (3–22h) (1) Corn oil 0.4g (0.300%) | (2) [a]/Starch (5m) 1.3g (1.00%) | 15 seconds | | |
| 19 | Grain Sorghum 153.1g @ 12.9% | (1) Corn oil 0.4g (0.300%) | (2) [b]/Clay 1.3g (1.00%) | 15 seconds | | |
| 20 | Grain Sorghum 153.1g @ 12.9% | (2,3,4) Corn oil 1.2g (0.900%) (3–1h) (4–2h) | (1) [c]/Phenol red 1.1g (0.825%) (5) CaO (15h) 1.3g (1.00%) | (2) 15 seconds (5) 10 seconds | | |
| 21 | Grain Sorghum 153.1g @ 12.9% | (1,3) Corn oil 0.4g (0.300%) (3–25m) | (2) (NH$_4$)$_2$SO$_3$ . H$_2$O 1.4g (1.05%) (3m) (4) Urea (4.5h) 1.5g (1.125%) | (2) 30 seconds (4) 15 seconds | | Exposure to infrared heat - 30 sec. |
| 22 | Grain Sorghum 153.1g @ 12.9% | (1) Corn oil 0.3g (0.225%) | (2) [d]/Borax 1.3g (1.00%) | 15 seconds | (3) 24.7g (13d) (25%) | Heated @ 65° C. for 12 hours |
| 23 | Grain Sorghum 153.1g @ 12.9% | (1,3) Corn oil 0.5g (0.375%) (3–13h) | (2) [e]/DES 1.3g (1.00%) | (2) 60 seconds (3) 5 seconds | | |
| 24 | Grain Sorghum 153.1g @ 12.9% | (1) Corn oil 0.4g (3.000%) | (2) Chloral hydrate (5m) 1.3g (1.00%) | 5–10 seconds | | |
| 25 | Grain Sorghum 153.1g @ 12.9% | (1) Corn oil 0.4g (0.3000%) | (2) [f]/Yeast (dry) 1.3g (1.00%) (5m) | 50–60 seconds (3) 50 seconds | (3) 24.7g (17h) (25%) | Heated @ 37° C. for 12 hours |
| 26 | Grain Sorghum 153.1g @ 12.9% | (1) Corn oil 0.2g (0.150%) | (2) [m]/Vit-min mix 0.5g (0.375%) (5m) | 30 seconds | | |
| 27 | Grain Sorghum 153.1g @ 12.9% | (1) Corn oil 0.3g (0.225%) | (2) [g]/Tenderizer 1.3g (1.00) (5m) | 30 seconds | (3) 24.7g (18½h) (25%) | Heated @ 65° C. for 24 hours |
| 28 | Grain Sorghum 153.1g @ 12.9% | (2) Corn oil (24h) 0.4g (0.300%) | (3) [h]/Gibrel 1.3g (1.00%) | 15 seconds | (1) 10.8g (18.7%) | |
| 29 | Grain Sorghum 153.1g @ 12.9% | (1,3) Mineral oil 5.3g (3.975%) (3–5d) | (2) CaO (5m) 20g (15.00%) | (2) Less than 5 min. (3) 10 seconds | | |
| 30 | Grain Sorghum 153.1g @ 12.9% | (1,3) Corn oil 5.3g (3.975%) (3–4d) | (2) CaO (5m) 20g (15.00%) | (2) Less than 5 min. (3) 10 seconds | | |
| 31 | Grain Sorghum 153.1g @ 12.9% | [k]/(Alt.) Corn oil 4.8g (3.6%) | [k]/(Alt.) CaO 20g (15.00%) | Few seconds, each 1% aliquat | | |
| 32 | Grain Sorghum 153.1g @ 12.9% | (1,3) Corn oil 5.3g (3.975%) (3–3d) | (2) Urea (5m) 20g (15.00%) | (2) Less than 5 min. (3) 10 seconds | | |
| 33 | Grain Sorghum 153.1g @ 12.9% | [k]/(Alt.) Corn oil 5.8g (4.350%) | [k]/(Alt.) Urea 40.5g (30.375%) | Few sec., each of 27 1.5 g increments | (1) 14.6g (20.5%) | |
| 34 | (1,3) Corn oil 153.1g @ 12.9% | (1,3) Corn oil 5.3g (3.975%) (3–3d) | (2) Glucose . H$_2$O 20g (15.00%) (5m) | (2) Less than 5 min. (3) 10 seconds | | |
| 35 | Grain Sorghum 153.1g @ 12.9% | (1,3) Corn oil 5.3g (3.975%) (3–3d) | (2) Sucrose 20g (15.00%) | (2) Less than 5 min. (3) 10 seconds | | |
| 36 | Grain Sorghum 153.1g @ 12.9% | (1) Corn oil 5.0g (3.75%) | (2) NH$_4$H$_2$PO$_4$ 20g (15.00%) | 60 seconds | | |
| 37 | Grain Sorghum 153.1g @ 12.9% | (1) Corn oil 5.0g (3.750%) | (2) NaCl (5m) 20g (15.00%) | 60 seconds | (3) 14.6g (20.5%) | |
| 38 | Grain Sorghum 153.1g @ 12.9% | (1,3) Corn oil 5.3g (3.975%) (3–24h) | (2) [n]/Minerals (5m) 20g (15.00%) | 60 seconds | | Exposed to infrared heat - 30 sec. |
| 39 | Corn 151.0g @ 11.7% | (1) Corn oil 0.3g (0.225%) | (2) Urea 1.5g (1.125%) | 15 seconds | | |
| 40 | [i]/Northern Beans 153.1g | (1) Corn oil 0.3g (0.225%) | (2) CaO (5m) 0.4g (0.30%) | 60 seconds | | |
| 41 | [i]/Northern Beans 153.1g | (1) Corn oil 0.3g (0.225%) | (2) CaO (5m) 0.4g (0.300%) | 60 seconds | | Exposed to infrared heat - 30 sec. |
| 42 | [j]/Pinto Beans 153.1g | (1) Corn oil 0.2g (0.150%) | (2) CaO (5m) 0.4g (0.300%) | 60 seconds | | Exposed to infrared heat - 30 sec. |
| 43 | Grain Sorghum 153.1g @ 12.9% | (1,3,5) Corn oil 1.5g (1.125%) (3–17h) (5–30h) | (4) [o]/Mixture (5m) 5.551g (4.125%) | (4) 30 seconds | (2) 2.0g (5m) (14.0%) | Exposed to infrared heat - 30 sec. |
| 44 | Peanuts, raw 150.0g | (1) Corn oil 0.6g (0.45%) | (2) NaCl (5m) 2.6g (2.00%) | 30 seconds | | |
| 45 | Grain Sorghum 153.1g @ 12.9% | (2) Animal fat (1h) 1.5g (1.125%) | (3) [p]/Premix 6.5g (4.875%) | 5 seconds | (1) 1.9g (14.0%) | |
| 46 | Corn 151.0g @ 11.7% | (2) Animal fat (1h) 1.5g (1.125%) | (3) [p]/Premix (5m) 6.5g (4.875%) | 30 seconds | (1) 4.0g (14.0%) | |
| 47 | Barley 148.8g @ 10.4% | (2) Animal fat (1h) 1.5g (1.125%) | (3) [p]/Premix (5m) 6.5g (4.875%) | 15 seconds | (1) 6.2g (14.0%) | |
| 48 | Oats 148.0g @ 9.9% | (2) Animal fat (1h) 1.5g (1.125%) | (3) [p]/Premix (5m) 6.5g (4.875%) | 15–20 seconds | (1) 7.1g (14.0%) | |
| 49 | Rice 145.7g @ 9.32% | (2) Animal fat (1h) 1.5g (1.125%) | (3) [p]/Premix (5m) 6.5g (4.875%) | 15–20 seconds | (1) 9.3g (14.0%) | |
| 50 | Rye 149.8g @ 11.0% | (2) Animal fat (1h) 1.5g (1.125%) | (3) [p]/Premix (5m) 6.5g (4.875%) | 20–25 seconds | (1) 5.2g (14.0%) | |
| 51 | Soybeans 145.3g @ 8.25% | (2) Animal fat (1h) 1.5g (1.125%) | (3) [p]/Premix (5m) 6.5g (4.875%) | 30 seconds | (1) 9.7g (14.0%) | |
| 52 | Triticale 145.1g @ 8.1% | (2) Animal fat (1h) 1.5g (1.125%) | (3) [p]/Premix 6.5g (4.875%) | 15 seconds | (1) 10.0g (14.0%) | |
| 53 | Wheat 147.2g @ 9.5% | (2) Animal fat (1h) 1.5g (1.125%) | (3) [p]/Premix (5m) 6.5g (4.875%) | 30 seconds | (1) 7.7g (14.0%) | |
| 54 | Grain Sorghum 211.8g @ 15.0% | (1) Corn oil 1.5g (0.222%) | (2) Na$_2$SO$_3$ (4m) 1.4g (0.778%) | 5 seconds | | (3) SO$_2$ (24h) 1.0g (0.556%) (4) Steamed for 4 |

EXAMPLES-continued

| | | | | | |
|---|---|---|---|---|---|
| 55 | Grain Sorghum 211.8g @ 15.0% | (1) Mineral oil 0.5g (0.278%) | (2) Ca(HCOO)₂ (5m) 1.8g (1.00%) | 10 seconds | min. @ 150 psig (3) Steamed for 4 min. @ 150 psig |
| 56 | Previously processed whole corn 203.9g @ 11.73% | ⁱ/(S) Corn oil 0.4g (0.222%) | ⁱ/(S) Urea 2.0g (1.111%) | 5 minutes | |
| 57 | Corn 151.1g @ 11.8% | (1) Soya oil 5.0g (3.750%) | (2) NaCl (5m) 20.0g (15.00%) | (2) 5 minutes | |
| 58 | Corn 151.7g @ 12.13% | (1) Soya oil 1.7g (1.275%) | (2) Urea (5m) 5.0g (3.750%) | (2) 5 minutes | |
| 59 | Grain Sorghum 153.1g @ 12.9% | (1,3,5) Soya oil 0.6g (0.450%) (3–55m) (5–22d) | (2) CaO (5m) 0.4g (0.30%) (4) Glucose . H₂O 1.3g (1.00%) (5m) | (2) 5 seconds (4) 1 minute | Exposed to infrared heat - 30 sec. |
| 60 | Wheat 2,000g @ 11.4% | (2) Soya oil 17.72g (1.000%) | (1) Wheat Dust (7m) 53.16g (3.00%) | (2) 1 minute | Milled and baked. |
| 61 | Wheat 2,000g @ 9.9% | (2) Mineral oil, heavy. 0.56g (0.031%) (7m) | (1,3,4) Wheat Dust 5.04g (0.2798%) (3–50m) (4–51m) | (2) 5 seconds (3) 2 seconds (4) 2 seconds | Milled and baked. |
| 62 | Wheat 100.0g @ 1.49% | (2) Corn oil 0.29g (0.327%) | (1) Wheat Dust (2m) 0.89g (1.00%) | (2) 5 seconds | |
| 63 | Grain Sorghum 153.4g @ 13.1% | (2) Corn oil (6m) 0.22g (0.165%) | (1,3) Grain Sorghum Dust. 1.32g (0.99%) (3–2m) | (2) 5 seconds (3) 2 seconds | |
| 64 | Grain Sorghum 153.4g @ 13.1% | (2) Cottonseed oil 0.22g (0.165%) (3m) | (1,3) Wheat Dust 1.32g (0.99%) (3–1m) | (2) 5 seconds (3) 2 seconds | |
| 65 | Corn 151.7g @ 12.1% | (2) Corn oil (3m) 0.11g (0.0825%) | (1,3) Corn Dust 0.66g (0.495%) (3–2m) | (2) 5 seconds (3) 2 seconds | |
| 66 | Corn 151.7g @ 12.1% | (2) Soya oil (4m) 0.11g (0.0825%) | (1,3) Corn Dust 0.66g (0.495%) (3–4m) | (2) 3 seconds (3) 2 seconds | |
| 67 | Soybeans 150.0g @ 11.1% | (2) Soya oil (5m) 0.11g (0.0825%) | (1,3,4) Soybean Dust 0.99g (0.7425%) (3–2m) (4–2m) | (2) 3 seconds (3) 2 seconds (4) 2 seconds | |
| 68 | Rice 150.0g @ 11.1% | (2) Mineral oil 0.11g (0.0825%) | (1,3,4) Rice Dust 0.99g (0.7425%) (3–4m) (4–2m) | (2) 3 seconds (3) 2 seconds (4) 2 seconds | |
| 69 | Barley 150.0g @ 10.3% | (2) Animal fat @ 65° C. o.11g (0.08171%) (86m) | (1,3,4) Barley Dust 0.99g (0.7354%) (3–2m) (4–2m) | (2) 3 seconds (3) 2 seconds (4) 2 seconds | |

Legend for Examples

ᵃ/Starch - Pearl corn starch
ᵇ/Clay - Bentonite
ᶜ/Phenol red - Phenolsulfonaphthalein, an indicator
ᵈ/Borax - Na₂B₄O₇ . 10H₂O
ᵉ/DES - Diethylstilbestrol
ᶠ/Yeast - Commercial, dried (Saccharomyces cerevisiae)
ᵍ/Tenderizer - Commercial meat preparation with seasoning and papain
ʰ/Gibrel - Commercial preparation of potassium gibberellate, 1.65% active ingredient
ⁱ/Northern Beans - Dried, from retail source
ʲ/Pinto Beans - Dried, from retail source
ᵏ/(Alt.) - Alternated application of vehicle and solids
ˡ/(S) - Simultaneous application of vehicle and solids ᵐ/Vitamin-Mineral Mixture; 0.5 g, including:
| | | |
|---|---|---|
| 4000 | USP | Vitamin A |
| 400 | ICU | Vitamin D |
| 50 | mg | Vitamin C |
| 3 | mg | Vitamin B₁ |
| 3 | mg | Vitamin B₂ |
| 1 | mg | Vitamin B₆ |
| 5 | mcg | Vitamin B₁₂ |
| 20 | mg | Niacin |
| 5 | mg | Pantothenic acid |
| 10 | IU | Vitamin E |
| 23 | mg | Calcium |
| 17 | mg | phosphorous |
| 0.05 | mg | Iodine |

ⁿ/Minerals - Trace mineral mix for ruminants. 20.00 grams included:

1.568 g Mn as MnSO₄
2.592 g Zn as ZnO
1.176 g Fe as FeSO₄ . 7H₂O and FeCO₃
0.200 g Cu as CuSO₄
0.275 g I as ethylene diamine dihydroiodide
0.132 g Co as CoCO₃ + CaCO₃ carrier ᵒ/Mixture - Inorganic mixture as follows:

| | |
|---|---|
| 1.981 g | NH₄H₂PO₄ |
| 1.923 g | (NH₄)₂SO₄ |
| 0.356 g | (NH₂)₂CO (Urea) |
| 0.653 g | CaO |
| 0.600 g | NaCl |

Trace Mineral Mix
3.000 mg Mn as MnSO₄
4.960 mg Zn as ZnO
2.250 mg Fe as FeSO₄ . 7H₂O and FeCO₃
0.038 g { 0.383 mg Cu as CuSO₄
0.527 mg I as ethylene diamine dihydroiodide
0.253 mg Co as CoCO₃ + CaCO₃ carrier ᵖ/Premixed chemicals, as follows:

Trace minerals (0.036%)
3.75 mg Mn as MnSO₄
6.20 mg Zn as ZnO
2.80 mg Fe as FeSO₄ . 7H₂O FeCO₃
0.04784 g { 0.48 mg Cu as CuSO₄
0.66 mg I as ethylene diamine dihydroiodide
0.32 mg Co as CoCO₃ + CaCO₃ carrier

| | | |
|---|---|---|
| 0.95675 g | NaCl | (0.718%) |
| 0.95675 g | CaCO₃ | (0.718%) |
| 0.47838 g | (NH₄)H₂PO₄ | (0.359%) |
| 0.38270 g | (NH₄)₂SO₄ | (0.287%) |
| 1.53080 g | Urea | (1.147%) |
| 1.91351 g | Bentonite | (1.435%) |
| 0.4783 g | Lysine . HCl | (0.036%) |

Vitamin-mineral Premix
| | | |
|---|---|---|
| 1343 | USP | Vitamin A |
| 134 | ICU | Vitamin D |
| 16.8 | mg | Vitamin C |
| 1 | mg | Vitamin B₁ |
| 1 | mg | Vitamin B₂ |
| 0.3 | mg | Vitamin B₆ |
| 1.7 | mcg | Vitamin B₁₂ |
| 0.19136 g | 6.7 mg | Niacin |
| 1.7 | mg | Pantothenic acid |
| 3.3 | IU | Vitamin E |
| 7.7 | mg | Calcium |
| 5.7 | mg | Phosphorous |
| 16.2 | mcg | Iodide |
| 0.8 | mg | Potassium |
| 1.7 | mg | Iron |

EXAMPLES-continued

| 2.5 | mg | Potassium | 5.551 g | Total | | 0.3 | mg | Magnesium |
|---|---|---|---|---|---|---|---|---|
| 5 | mg | Iron | | | | | | |
| 1 | mg | Magnesium | 6.50592 g | Total (4.875)% | | | | |

DISCUSSION OF THE EMBODIMENTS

The efficacy of various vehicles is shown in Examples 1 through 9, in which the primary variable was the vehicle. Three of the vehicles, animal fat (Example 2), oleomargarine (Example 5) and white petroleum jelly (Example 7), may be classified, roughly, as semisolids. The animal fat, obtained from a large cattle feeding enterprise where it is added to the ration, was not a uniform product. However, no difficulties were encountered with incorporation into the grain. Two carriers, white petroleum jelly, "Vaseline" (Example 7), and mineral oil (extra heavy) (Example 6) are of mineral source; six of the vehicles are from a vegetable source, corn oil (Example 1), olive oil (Example 4), peanut oil (Example 8), coconut oil (Example 9), soya oil (Examples 57, 58, 59, 60, 66 and 67), cottonseed oil (Example 64), and oleomargarine made from corn oil (Example 5); one is an essential oil, anise oil (Example 3) from a vegetative source; and one is from an animal source, animal fat (Example 2).

Two of the vehicles were unrefined, cottonseed oil (Example 64) and soya oil (Example 66), and the mineral oil in Example 68 had no preservative. Anise oil was adsorbed both prior to and after addition of the salt (NaCl). Corn oil was added after the salt had been mixed with the grain. With all vehicles, the sorption was rapid.

A variety of solids, representing widely variable chemical types have been sorbed, as shown by the examples. NaOH, a very reactive alkali was readily sorbed (Example 10) by the grain with normal moisture. Kernels sectioned later revealed a significantly improved endosperm uniformity. About 15 minutes after encapsulation, the grain sample darkened, indicating reaction throughout the berries between various tissues and the alkali, and involving water associated with grain tissues.

Elemental sulfur (Example 11), sublimed flowers of sulfur of pharmaceutical purity, was sorbed with ease. One percent of sucrose (Example 12) was readily adsorbed, then subjected to infrared heating, causing an aroma resembling fresh bread and an endosperm with much improved uniformity. Very similar results were achieved when CaO and glucose were sorbed, then heated by infrared energy (Example 59). Endosperm uniformity improvements were even greater in Example 13 in which a reducing agent, sodium formate, was sorbed, then the grain subjected to a brief but intense infrared exposure. Calcium oxide was sorbed by corn (Example 14) using corn oil as the vehicle. Subsequent infrared heating improved the endosperm quality somewhat. CaO or $Ca(OH)_2$ is used in the process of cooking corn to make tortilla flour. Lysine, an essential amino acid in which most feed grains are deficient was sorbed by grain sorghum (Example 15) using corn oil which was mixed with the grain before addition of the amino acid and added twice after addition of that solid. In Example 16, NaCl was encapsulated in grain sorghum and then the moisture was increased to more than 20 percent. The subsequent water adsorption rate was very similar to that of the same grain without the NaCl.

Very large, complex, and dissimilar molecular aggregates were sorbed by grain sorghum, using corn oil as the vehicle. Casein, milk protein (Example 17), was sorbed in one minute or less. Pearl corn starch (Example 18), whose granules generally vary in diameter from eight to 15 microns, were very readily adsorbed. Bentonite (Example 19), an aluminum silicate clay of the montmorillonite type, was also rapidly sorbed by the grain. Bentonite is frequently used in animal feeds because of its inorganic content.

Examples 20 and 21 show the efficacy of adding various solids, one at a time, with intervening additions of the vehicle. In Example 20, phenol red was sorbed by the grain to illustrate the extent of sorption. Following sorption, several kernels were sectioned to expose the largest amount of endosperm. Tiny drops of dilute alkaline solution were applied to the center of the exposed endosperm in a manner which precluded contact with the outer regions. The instant development of a pink color indicated sorption of the dye in the center of the kernel structure. Later, CaO was subsequently sorbed into the grain. In Example 21, $(NH_4)_2SO_3.H_2O$, and NPN compound with strong reducing power, was sorbed into the grain, followed in about five hours by the sorption of urea. Subsequent infrared heat treatment resulted in much increased endosperm uniformity.

As noted with other chemicals in water solution, borax ($Na_2B_4O_7.10H_2O$), frequently used in connection with starch utilization, is sorbed nonuniformly by whole cereal grain. In Example 22, borax, a powerful swelling agent for starch in the presence of water, was readily adsorbed by whole grain sorghum seeds and using corn oil as the vehicle. Water was then adsorbed by the grain to the 25 percent level, then heated at 65° C. for 12 hours. After drying to the normal moisture content, the seeds were sectioned showing endosperms which were nearly uniform.

Diethylstilbestrol (DES), a synthetic hormone frequently used in animal therapy and in steer feeding rations, was sorbed in grain sorghum (Example 23) using corn oil as the vehicle. The amount sorbed was massive in context with steer fattening but it is obvious that lesser amounts can be incorporated. There is a current controversy between governmental regulation agencies and cattle feeders due to possible toxic meat produced from DES fed animals. However, the efficacy of any particular feed additive, whether drug or otherwise, is not an objective of this invention. Rather, the efficacy lies in methods to encapsulate solids into whole seeds within the obvious confines of official regulations, prudence, and application efficacy, to produce highly desirable feeding and other materials for a variety of purposes.

Chloral hydrate, a reactant used to produce a modified starch product experimentally, and reported as a methane production inhibitor in ruminant feeding, was incorporated very rapidly in grain sorghum (Example 24), using corn oil as a vehicle. Thus, a relationship of reactor and reactant was fashioned which is suitable for subsequent treatment.

Yeast cells (saccharomyces cerevisiae), viable, dried and simple plant cells, were readily incorporated into grain sorghum using corn oil as the carrier (Example 25). Subsequent additions of water, followed by incubation at 37° C. for 12 hours, caused gas production in amounts consistent with available sugar present in the normal grain. An obvious variation would be the simultaneous incorporation of yeast foods or appropriate enzymes, or both.

Example 26 illustrates the ease of incorporation of a vitamin-mineral mixture into grain sorghum, though somewhat excessive in amount. The encapsulation of the same vitamin mix, including a large number of other solids and using another vehicle, are included in other examples.

In Example 27, a household meat tenderizer, including seasonings and papain, a proteolytic enzyme from the papaya plant, was encapsulated in grain sorghum using corn oil as the vehicle. The treated grain was subsequently increased in moisture content to 25 percent, followed by heating for 24 hours at 65° C., an optimum temperature for activity of papain. Sectioned kernels revealed a much increased endosperm uniformity. After drying and cooling other randomly selected sectioned kernels also showed increased endosperm uniformity. It can be seen that degredation of the protein matrix increases starch availability by removing a significant portion of the inhibiting characteristics of that matrix. At the same time, the protein availability may be increased. Nutritionists have calculated starch and protein availability to be about 65 to 80 percent, depending on the animal and method of expression. When these percentages are multiplied by the huge tonnage of grains used for animal feeding, possible increases in animal utilization are of enormous economic importance.

In Example 28 a commercial preparation, Gibrel, containing 1.65 percent of potassium gibberellate and the remainder a filler of unknown origin was sorbed into the grain sorghum sample using corn oil as a carrier. The plant metabolite is known to stimulate the germination processes of seeds under appropriate sprouting conditions.

Examples 29 through 38 and 57 illustrate the process efficacy by encapsulation of inordinately large quantities of chemicals into whole seeds, necessary for the production of products containing concentrated chemical sources for feeding and a variety of other processes. Generally, the grains containing relatively large amounts of solids and carrier did not increase in volume in proportion to amounts of additives, thus increasing the density. The increase in density, unlike that resulting from water adsorption, is highly indicative of sorption in heretofore unavailble areas of the seed, and is tantamount to proof of sorption in all seed tissues since it is impossible to sorb such quantities in the pericarp and germ areas only.

Examples 29, 30 and 31 illustrate methods for sorbing into a cereal seed 15 percent of calcined lime (CaO). Typical of many calcium compounds, lime is only very sparingly soluble in water (less than 0.2 percent). CaO was added to the grain-vehicle mixture all at once in two examples, using extra heavy mineral oil in Example 29, and corn oil as the carrier in Example 30. In Example 31, CaO and corn oil were added to the grain alternately in 1.3 or 1.4 gram and 0.3 and 0.4 gram increments, respectively. Although vehicular efficiency was increased somewhat, the ratio of solid to carrier change was minor.

Examples 32, 33 and 58 illustrate well the efficiency of sorbing urea in large quantities, thus providing a novel, simple and economic method to provide a product with a very high equivalent protein value for ruminant feeding. Condensation of urea with cereal grain polymers is an old objective, but one which has not been achieved in a manner which is economically attractive. Certainly, there are no methods presently available to those in the art which provide for encapsulation of that chemical in the whole seed in which the gross integrity of the seed is maintained. Using the present process, such as that of Example 32, wherein 15 percent of urea was adsorbed by the whole grain, the resultant product had an analyzed total protein equivalency of 39.68 percent and a final moisture content of 11.1 percent. It may be expected that the urea so introduced will condense to some degree with the berry tissues at ordinary temperatures. However, the presence of heat, such as that normally used to prepare rations for ruminant animals in large feedlots, would increase still further the extent of condensation. Such condensation, observed in the steam flaking or "micronizing" process, the latter being a process involving infrared heating immediately followed by rolling, together with encapsulation itself, serve to inhibit the rate of chemical release to more closely conform to the rate of availability of the remaining nutrients.

In Example 33, the grain moisture was increased to 20.5 percent, then corn oil added in 0.2 and 0.3 gram increments, and urea in 1.5 gram increments, added alternately over a period of time. The analyzed equivalent protein was 58.96 percent with 15.95 percent moisture, based on total solids. Equivalent protein on a dry basis was 70.15 percent. Equivalent protein in this example (33) was higher than oilseed protein concentrates and clearly shows the flexibility of the method.

Examples 34 and 35 illustrate the rapid addition of glucose (Example 34) and sucrose (Example 35), appropriate for readily available energy for food or feed, or the availability to microorganisms such as yeast cells.

Similarly, $NH_4H_2PO_4$, an excellent and commonly used source of NPN and phosphorous, was incorporated into grain sorghum using corn oil as the vehicle in Example 36. The vehicle and solid, 3.75 and 15.0 percent of the dry grain weight, respectively, were incorporated in less than 60 seconds, with most of the two-phase system disappearing within 15 seconds after introduction of the solids. The total equivalent protein content was determined to be 17.53 percent and the phosphorous content was calculated to be 3.02 percent, both based on total solids and final moisture content.

Sodium chloride (Example 37) was sorbed by grain sorghum in quantity, 15 percent by dry grain weight, which groosly exceeds the amount which can be sorbed into the seedcoat layers from aqueous solutions of any concentration. Subsequent water adsorption was fairly rapid and only slightly inhibited by the presence of the large quantities of the synergetic two-phase system, further support for the conviction of nonpolar area sorption.

Example 38 illustrates the ease in fashioning a trace mineral concentrate in grain sorghum using corn oil as the vehicle. The 15 percent used represents about 300 times the trace mineral requirement by the ruminant animal in a straight ration.

In Example 39, sufficient urea and corn oil was encapsulated into whole corn kernels to increase the total equivalent protein level to about 11 percent, sufficient for the average cattle feeding ration which usually varies from about 10.5 to 12 percent, depending on the age of the animal.

Dry northern beans, sometimes called "navy beans", were used in Examples 40 and 41, whereby 0.4 grams of calcium oxide was encapsulated therein, using corn oil as the carrier. The beans in Example 40 were then cooked by conventional boiling. The cooking time necessary was decreased, as compared to untreated beans, and yielded a product which tended to be firmer and resisted mushiness. Further, the product seemed to be easier to digest. In Example 41, the treatment was the same except that a 30-second infrared heat treatment was superimposed on the chemical treatment. The resultant product exhibited further decrease in cooking time, firmer beans, and were notably easier to digest.

Very similar results were observed when dried pinto beans (Example 42) were treated with CaO, corn oil and subsequent heat from an infrared source. The beans retained shape and the desirable firmness, cooked in significantly less time and were observed to digest with less difficulty as compared to untreated cooked pinto beans.

Example 43 shows the utility of incorporating all of the required nutrients, not already furnished by the grain, into whole grain sorghum to fashion what is considered to be a complete ration for steer fattening. Subsequent infrared heating significantly increased endosperm uniformity.

In Example 44, two percent NaCl was incorporated into the seed structure of raw peanuts, using corn oil as the vehicle.

Examples 45 through 53 clearly illustrate the efficacy of encapsulation of a large variety of solids into a variety of seeds which include barley, corn, grain sorghum, oats, rice, rye, triticale, wheat and soybeans. In these examples animal fat, because of its utility and economy, was used as the vehicle, and the solid additive combination was identical in all examples. Also, the moisture was adjusted to the same level (14 percent) in each example. As noted, the sorption of the synergetic combination of animal fat and solids varied from a few seconds to about 30 seconds. Considering the low protein grains, corn and grain sorghum, the requirements for an all-concentrate cattle finishing ration have been attained, although the B complex vitamins and vitamin E are not normally required by ruminants since they have the ability to synthesize those entities. The products have been prepared for immediate processing by the feedlot operator; only the amount of roughage, if any, required by the operator may be added. In addition, other advantages to the fed animal are included, such as slow NPN release and uniformity of feed ingredients which cannot stratify and separate.

Examples 54 and 55 have been included to show the advantage of sorption of chemicals appropriate for superimposed steam processing. In Example 54, 1.4 grams of $Na_2SO_3$ (equivalent to 0.395 percent of sulfur dioxide) was encapsulated in grain sorghum prior to sorption of sulfur dioxide, which was accomplished by way of processes in U.S. Pat. Nos. 3,725,081 and 3,911,147. It was an objective to place a chemical reducing compound in both polar and nonpolar areas of sorption. After steaming for four minutes at 150 psig, the grain was dried and ground. The product was 77.23 percent cold water soluble, an improvement over a sample of identical grain and identically treated except that the control experiment had no $Na_2SO_3$ and oil encapsulated.

In Example 55, one percent of calcium formate and 0.28 percent of mineral oil vehicle was sorbed by the grain sorghum, then steamed for four minutes at 150 psig. The resultant product was 71.28 percent cold water soluble and exhibited the highly adhesive characteristics required of a feed pellet binder, wall board adhesive, charcoal briquette adhesive, and the like.

Illustrating the advantage of incorporating a solid in previously processed whole grain, gelatinized corn, 0.4 grams of corn oil and two grams of urea were simultaneously adsorbed by the cooked grain (Example 56). Such adsorption shows the internal vector forces to be intact to cause the adsorption of the synergetic mixture even though gelatinized. Predictably, samples identical with Examples 54 and 55, which had been chemically degraded to destroy most of the internal primary vector forces, would notadsorb the synergetic mixtures.

Examples 60-69 clearly reveal the embodiments of the invention directed toward the adsorption of seed dust by various seeds and using various appropriate oleaginous vehicles. The examples set forth were selected from a large number of experimental examples which included all of the commodity seeds, dust and mixtures of dust from various seeds, and oleaginous vehicles and mixtures of these vehicles. In most cases, the dust (though a U.S. 60 mesh screen) had been sifted from the grain, then added back in proportions shown to ensure known amounts of dust. In all cases the "dust" included substantial amounts of particles smaller than 37 microns. In all of the illustrative examples the amount of dust added represented substantially more than that normally found in any of the seed commodities, all of which yield dust during normal handling to cause a number of serious problems.

Example 60 was included to illustrate the efficiency of the process even under extreme and unreasonable circumstances. The three percent dust (2.66 percent, based on "as is" grain weight) represents an amount 15 to 50 times more than normally found with the wheat, according to various sources and depending on age and condition of the grain. In this example the ratio of solids (dust) to vehicle in the synergetic mixture was only 3:1. Thus treated, the sample was milled into flour and baked by an independent laboratory. Water adsorption by the treated wheat (tempering), mill extraction (flour yield from the grain), and most baking characteristics (loaf volume and bread grain and texture) were normal as compared to identical but untreated wheat ("control"). However, flour color, ash content and flour odor were adversely affected, reflecting the high content of synergetic mixture adsorbed into the grain endosperm. The "musty" odor reported was caused by the dust.

The wheat in Example 61 was mixed with one-third of the total dust added, then the vehicle mixed vigorously with the extremely dusty grain resulting in the very rapid and simultaneous adsorption of both phases of the synergetic mixture. Another third of the dust was mixed with the wheat seeds to simulate the issue of new dust caused by additional handling. The final third of the dust was then mixed with the grain of the same reason. The total amount of dust added was about triple that normally encountered. In each case the dust adsorption occurred as rapidly as the big glass container could be shaken. Prior to addition of the mineral oil vehicle, the jar atmosphere was extremely hazy and opaque. After all of the synergetic mixture had been added, there was no visible dust whatever. Subsequent milling of the wheat, and baking of the resultant flour, produced results which were considered to be normal as compared to the "control" grain.

The wheat used in Example 62 was dehydrated to 1.49 percent moisture specifically for the purpose of demonstrating the independence of the process efficacy from grain moisture content. No difference in rate of sorption of the two phases, corn oil and wheat dust, was observed as compared to wheat with a normal moisture content.

Grain sorghum dust (one-half the total) was mixed with the grain sorghum before addition of the corn oil vehicle (Example 63) and the rest after the synergetic mixture had been adsorbed. The adsorption of the latter is always significantly faster because the vehicle has already been dispersed.

In Example 64 wheat dust was used in conjunction with whole grain sorghum and unrefined cottonseed oil to illustrate the irrelevance of a particular source of dust with any special seed type. Grain elevators commonly handle various commodities with the inevitable mixing of dust types and even mixing of seed types to some extent.

The synergetic mixture of corn dust and corn oil was used in conjunction with corn in Examale 65, an obvious expedient when the intended use includes the production of corn oil. When intended for animal feeds where most corn is used, any of the oleaginous vehicles may be appropriately used, such as the unrefined soya oil in Example 66.

Virtually all soybeans are processed into two primary products, soybean meal and soya oil. As shown in Example 67, soybean dust was mixed with soybeans, then mixed with unrefined soya oil, resulting in the very rapid sorption of the synergetic mixture. Two more equal additions of soybean dust were then mixed with the beans. No atmospheric dust could be observed when the sample was shaken. By such practice a soybean supplier or processor could protect the purity of his oil product if desired, even though the amount of the oleaginous vehicle added would be extremely small in most cases.

One-third of the rice dust added was mixed with the whole grain rice (Example 68), followed by the mixing of all of the food grade mineral oil used. Simultaneous adsorption of both phases by the rice was, typically, remarkably rapid. The remaining dust, as with the aforegoing examples, was added in two equal aliguots to simulate the issue of new dust caused by further grain handling. As shown in the Table of Examples, adsorption of all dust additions was very rapid.

Sixty-five degrees C. animal fat was used as the vehicle in Example 69 along with barley dust in conjunction with whole barley. The speed and efficiency of adsorption of the synergetic mixture approximated that of the other examples.

Obviously, all of the oleaginous vehicles disclosed herein are operative with seed dust or the other disclosed solids.

In general, a solids (dust)-to-oleaginous vehicle ratio of 3:1 to 4.5:1 was required for the simultaneous and total adsorption of the synergetic mixtures. However, in every instance where a deficiency in vehicle was used, relative to that required for total adsorption of both phases, excellent dust control resulted due to the preferential adsorption of the smaller particles. Larger particles are not the cause of explosive conditions. Thus, in the practical application of the process, ratios of 6:1 to 10:1 were found to exhibit excellent process efficacy. Since the quantities of dust are generally very small compared to grain weight, the necessary quantity of vehicle used is minute. For control of wheat dust, for example, 250 to 500 p.p.m. (0.025 to 0.050 percent, based on dry grain weight) of the vehicle is adequate. In the event that an excess of the vehicle was applied to a given lot of grain, that grain may be mixed with similar but untreated grain. Conversely, if too little vehicle was applied to adsorb the dust present, an obvious expedient would be to apply additional vehicle to the grain.

SUMMARY

From the aforegoing discussion and examples, it is evident that an array of novel processes and products have been provided by the present invention which is predicated on the surprising discovery of the phenomenon of sorption by whole seeds of the synergetic mixture of solids and oleaginous vehicles. The process provides for the encapsulation of large amounts of solids in virtually limitless combinations, and in a manner which provides component availability which more closely paralells that of the tissues of the seeds and which precludes its subsequent resolution into original components. Furthei, it has been shown in the selected examples, by their reaction to a dye, reactions following adsorption, reactions in subsequent superimposed processes, large quantities of solids sorbed, bread baking tests, and the like, that the gross structure of all seed tissues are involved in sorption of the synergetic mixture. Also illustrated is the efficacy in the sorption of solids, which vary widely in chemical composition and physical configuration, to provide significantly enhanced whole seed nutritional quality.

Provided are methods which obviate many seed utilization processes which are dependent upon seed comminution. The method for processing utilizes the natural seed structure intact to utilize the grain marketing channels, present and future, and provides the various seed consuming entities with an energy source better balanced nutritionally. Embodiment of very rapid and accurate processing, at a cost which approximates a theoretical minimum, provides the seed with reactive chemicals, catalysts, viable cells, and the like, for subsequent and superimposed processing. Further, a method is provided to sorb solids into whole seed tissues to provide that which is regarded as a complete ruminant ration. In addition, an extremely effective and inexpensive method is provided for the adsorption of dust to eliminate grain warehouse explosions, reduce fire hazards, and vastly improve environmental conditions for involved employees and the general public. All of such products of the method will immediately indicate to those skilled in the seed utilization arts that the properties for subsequent use or treatment have been significantly enhanced.

It is to be understood that this invention is not limited to the exact embodiments of the methods and various apparatus shown and described, which are merely by way of illustration and not limitation, as various changes may be made therein which are within the spirit of the invention and scope of the claims; it is, therefore, intended that claims cover all such claims and modifications.

What is claimed is:

1. A method for treating whole seeds to render the internal structures thereof more available for use which comprises:

(a) contacting the whole seeds with a synergistic mixture of a fine solid material and an oleaginous vehicle which alone are not significantly sorbed into the seeds but in mutual presence result in the relatively rapid sorption of the components by the seeds, and (b) maintaining the contact until the synergistic mixture has been sorbed by the seeds.

2. The method of claim 1 in which the particles of the fine solid material pass through a U.S. 60 mesh screen.

3. The method of claim 1 in which the oleaginous vehicle is a member selected from the group consisting of oils, fats and greases of animal, vegetable and mineral origin.

4. The method of claim 3 in which the oleaginous vehicle is a member selected from the group consisting of mineral oil, soya oil, corn oil, peanut oil, cotton seed oil, coconut oil, oleomargarine, white petroleum jelly, animal fat and olive oil.

5. The method of claim 1 in which the whole cereal seeds are selected from the group consisting of barley, corn, grain sorghum, millet, oats, rice, rye, triticale and wheat.

6. The method of claim 5 in which the fine solid material is a non-protein nitrogenous material and the total equivalent protein of the treated seeds is increased to about 50 percent.

7. The method of claim 5 in which the fine solid is a chemical reactive with the tissues in the seed to increase endosperm uniformity and tissue availability for subsequent use.

8. The method of claim 7 in which the fine reactive chemical is selected from the group consisting of: sodium tetraborate, calcium oxide, chloral hydrate, sodium hydroxide, sodium formate, calcium formate, and sodium sulfite.

9. The product produced by the method of claim 1.

10. A method for treating whole cereal grain and legume seeds to render the internal structure thereof more available for use which comprises:

(a) contacting the whole seeds with a synergistic mixture of compounds which alone are not significantly sorbed into the seeds but in mutual presence result in the relatively rapid sorption of the components by the seeds, the components comprising fine solid material and an oleaginous vehicle, and (b) maintaining the contact until substantially all of both phases of the synergistic mixture has been sorbed into the seeds.

11. The method of claim 10 in which the particles of the fine solid material pass through a U.S. 60 mesh screen.

12. The method of claim 10 in which the oleaginous vehicle is a member selected from the group consisting of oils, fats and greases of animal, mineral and vegetable origin.

13. The method of claim 12 in which the oleaginous vehicle is a member selected from the group consisting of mineral oil, soya oil, corn oil, peanut oil, cotton seed oil, coconut oil, oleomargarine, white petroleum jelly, animal fat and olive oil.

14. The method of claim 10 in which the whole cereal seeds are selected from the group consisting of barley, corn, grain sorghum, millet, oats, rice, rye, triticale and wheat.

15. The method of claim 14 in which the fine solid material is a non-protein nitrogenous material and the total equivalent protein of the seeds is increased to about 50 percent.

16. The method of claim 14 in which the fine solid material is a chemical reactive with the tissues in the seeds to increase endosperm uniformity and tissue availability for subsequent use.

17. The method of claim 16 in which the fine reactive chemical is selected from the group consisting of: sodium tetraborate, calcium oxide, chloral hydrate, sodium hydroxide, sodium formate, calcium formate, and sodium sulfite.

18. The method of claim 10 in which substantially all of the oleaginous vehicle and the fine solid material of the synergetic mixture are sorbed into the whole seed structure within up to a time period of about five minutes.

19. The method of claim 10 in which the ratio of the fine solid material to the oleaginous vehicle in the synergistic mixture varies from about 1:1 to about 6:1 by weight.

20. The method of claim 10 in which the whole legume seeds are selected from the group consisting of: pinto beans, northern beans, soybeans, and peanuts.

21. The method of claim 10 in which the fine solid material is calcium oxide, or its hydrate, and which comprises subjecting the treated seeds to infrared heat to increase the endosperm uniformity and availability.

22. The method of claim 22 in which the fine solid material is a fine solid chemical reactive with the endosperm tissues whereby the treated endosperm tissues are more available, hydratable, and more easily digested.

23. The method of claim 10 in which the fine solid material is urea whereby the treated seeds are converted into a concentrated nitrogen source with a total equivalent protein content of at least 70 percent, moisture free basis.

24. The method of claim 10 in which the fine solid material is a member selected from the group consisting of: sodium chloride, ammonium biphosphate, ammonium sulfate, urea, bentonite clay, lysine, manganese sulfate, zinc oxide, ferrous sulfate, ferrous carbonate, copper sulfate, ethylene diamine dihydroiodide, cobalt carbonate, niacin, pantothenic acid and vitamins A, D, C, $B_1$, $B_2$, $B_6$, $B_{12}$, and E.

25. The method of claim 10 followed by subsequent processing which comprises subjecting the treated seeds to infrared heat to increase endosperm uniformity and availability.

26. The method of claim 10 followed by subsequent processing which comprises subjecting the treated seeds to superatmospheric steam pressure to produce a product with increased water solubility and adhesive properties.

27. A method for treating whole cereal seeds to render the internal structure thereof more available for use which comprises:

(a) contacting the whole seeds with a synergistic mixture of components which alone are not significantly sorbed into the seeds but in mutual presence result in the relatively rapid sorption of the components by the seeds, the components comprising urea and an oleaginous vehicle selected from the group consisting of corn oil, soya oil, animal fat, olive oil, oleomargarine, mineral oil, white petroleum jelly, cotton seed oil, peanut oil and coconut oil, the weight of the synergistic mixture being up to about 35 percent of the dry weight of the seeds, the ratio of the urea to the oleaginous vehicle varying from about 1:1 to about 6:1, the particles of the urea sized to pass through a U.S. 60 mesh screen, and (b) maintaining the contact until the synergistic mixture has been adsorbed by the seeds.

28. The method of treating whole cereal and legume seeds to render the internal structures thereof more available for use which comprises:
   (a) contacting the whole seeds selected from the group consisting of barley, corn, grain sorghum, millet, oats, rice, rye, triticale, wheat, pinto beans, northern beans, soybeans, and peanuts, with a synergistic mixture of components which alone are not significantly adsorbed into the seeds but in mutual presence result in the relatively rapid sorption of the components by the seeds, the components comprising a fine reactive chemical material which passes through a U.S. 60 mesh screen, and is selected from the group consisting of sodium chloride, sodium hydroxide, sulfur, sucrose, glucose, bentonite clay, ammonium sulfate, urea, borax, diethyl stilbestrol, chloral hydrate, potassium gibberellate, yeast, ammonium biphosphate, sodium sulfate, sodium formate, and calcium formate, and an oleaginous vehicle selected from the group consisting of: corn oil, soya oil, olive oil, peanut oil, cotton sead oil, coconut oil, oleomargarine, petroleum jelly, and mineral oil, and
   (b) maintaining the contact until the synergistic mixture has been sorbed by the seeds.

29. A method for eliminating dust associated with whole seeds to reduce the hazards due to the presence of the dust during handling and storage of the whole seeds which comprises:
   (a) contacting the whole seeds and concomitant dust with an oleaginous vehicle to form a synergistic mixture of components of dust and oleaginous vehicle which alone are not significantly sorbed into the seeds but in mutual presence result in the relatively rapid sorption of the components by the seeds and
   (b) maintaining the contact until the formed synergistic mixture of oleaginous vehicle and dust has been sorbed by the seeds.

30. A method for eliminating dust associated with whole cereal grains and legume seeds to reduce the hazards due to the presence of the dust during handling and storage of the seeds which comprises:
   (a) contacting the whole seeds and concomitant fine dust with an oleaginous vehicle to form a synergistic mixture of components of dust and oleaginous vehicle which alone are not significantly sorbed into the seeds but in mutual presence result in the relatively rapid sorption of the components by the seeds, and
   (b) maintaining the contact until substantially all of both phases of the synergistic mixture has been sorbed into the seeds.

31. The method of claim 29 in which the particles of the dust pass through a U.S. 60 mesh screen.

32. The method of claim 29 in which the oleaginous vehicle is a member selected from the group consisting of oils, fats and greases of animal, mineral and vegetable origin.

33. The method of claim 32 in which the oleaginous vehicle is a member selected from the group consisting of mineral oil, soya oil, corn oil, cotton seed oil, peanut oil, coconut oil, oleomargarine, white petroleum jelly, animal fat, and olive oil.

34. The method of claim 29 in which the whole cereal seeds are selected from the group consisting of barley, corn, grain sorghum, millet, oats, rice, rye, triticale and wheat.

35. The method of claim 29 in which the ratio of the dust to the oleaginous vehicle in the synergistic mixture varies from about 3:1 to about 9:1, by weight.

36. The method of claim 29 in which substantially all of the oleaginous vehicle and the fine dust of the synergistic mixture are adsorbed into the whole seed structure within up to a time period of about five minutes.

37. The method of claim 29 in which the whole legume seeds are selected from the group consisting of: pinto beans, northern beans, soybeans, and peanuts.

38. A method for eliminating dust associated with whole cereal and legume seeds to reduce the hazards due to the presence of the dust during handling and storage of the seeds which comprises:
   (a) contacting the whole seeds selected from the group consisting of barley, corn, grain sorghum, millet, oats, rice, rye, triticale, wheat, pinto beans, northern beans, soybeans and peanuts, along with the concomitant dust, with an oleaginous vehicle to form a synergistic mixture of components of dust and oleaginous vehicle which alone are not significantly sorbed into the seeds, but in mutual presence result in the relatively rapid sorption of the components by the seeds, the dust passing through a U.S. 60 mesh screen and the oleaginous vehicle selected from the group consisting of: corn oil, soya oil, olive oil, cotton seed oil, peanut oil, coconut oil, oleomargarine, petroleum jelly and mineral oil, and
   (b) maintaining the contact until the synergistic mixture has been sorbed by the seeds.

39. The method of claim 38 in which the ratio of the dust to the oleaginous vehicle in the synergistic mixture varies from about 3:1 to about 9:1, by weight.

40. The method of claim 38 in which substantially all of the oleaginous vehicle and the fine dust of the synergistic mixture are sorbed into the whole seed structures within a time period of about five minutes.

41. The method of claim 38 in which the whole legume seeds are selected from the group consisting of: pinto beans, northern beans, soybeans and peanuts.

42. A method for eliminating dust associated with whole cereal seeds to reduce the hazards due to the presence of the dust during the handling and storage of the seeds which comprises:
   (a) contacting the whole seeds and concomitant dust with an oleaginous vehicle to form a synergistic mixture of components of dust and oleaginous vehicle which alone are not significantly adsorbed into the seeds but in mutual presence result in the relatively rapid sorption of the components by the seeds, the oleaginous vehicle selected from the group consisting of corn oil, soya oil, animal fat, olive oil, oleomargarine, mineral oil, white petroleum jelly, cotton seed oil, peanut oil and coconut oil, the weight of the synergistic mixture being up to about four percent of the dry weight of the seeds, the ratio of the dust to the oleaginous vehicle varying from about 3:1 to about 9:1, the particles of the dust sized to pass through a U.S. 60 mesh screen, and
   (b) maintaining the contact until the synergistic mixture has been sorbed by the seeds.

* * * * *

REEXAMINATION CERTIFICATE (1581st)
United States Patent [19]

Barham, Jr. et al.

[11] B1 4,208,4

[45] Certificate Issued    Oct. 29, 19

[54] METHOD FOR THE ADSORPTION OF SOLIDS BY WHOLE SEEDS

[75] Inventors: Harold N. Barham, Jr., Lubbock; Harold N. Barham, deceased, late of Lubbock, both of Tex., by Doris Barham, heir

[73] Assignee: Seed Technology of Texas, Ltd., Lubbock, Tex.

Reexamination Request:
No. 90/001,170, Feb. 24, 1987

Reexamination Certificate for:
Patent No.: 4,208,433
Issued: Jun. 17, 1980
Appl. No.: 907,834
Filed: May 19, 1978

[51] Int. Cl.$^5$ .................................................. A23K 1/72
[52] U.S. Cl. ........................................ 426/69; 426/72; 426/73; 426/74; 426/93; 426/293; 426/309; 426/629; 426/630; 426/632; 426/634; 426/807

[56] References Cited

U.S. PATENT DOCUMENTS

| | | |
|---|---|---|
| 326,227 | 9/1885 | Long . |
| 854,003 | 5/1907 | Somlo . |
| 1,155,560 | 10/1915 | Fry . |
| 1,376,082 | 4/1921 | Dodds . |
| 1,434,879 | 11/1922 | Dodds . |
| 1,612,072 | 12/1926 | Stinson . |
| 1,997,083 | 4/1935 | Robison . |
| 2,020,533 | 11/1935 | Zaloom . |
| 2,117,315 | 5/1938 | Gössel . |
| 2,143,306 | 1/1939 | Earle . |
| 2,166,974 | 7/1939 | Shields . |
| 2,222,370 | 11/1940 | Mori . |
| 2,263,099 | 11/1941 | Olsen . |
| 2,322,516 | 6/1943 | Horvath . |
| 2,399,464 | 4/1946 | Butcher . |
| 2,423,449 | 7/1947 | Heald et al. . |
| 2,474,182 | 6/1949 | Kephart . |
| 2,504,159 | 4/1950 | Singer et al. . |
| 2,585,026 | 2/1952 | Moen et al. . |
| 2,668,121 | 2/1954 | Rizzardi . |
| 2,898,215 | 8/1959 | Ferrel . |
| 2,926,091 | 2/1960 | Riddle . |
| 2,965,488 | 12/1960 | Belasco . |
| 3,063,800 | 11/1962 | Dancy . |
| 3,155,521 | 11/1963 | Ward et al. . |
| 3,155,521 | 11/1964 | Ward et al. . |
| 3,469,994 | 9/1969 | Williams . |
| 3,642,489 | 2/1972 | Bartley et al. . |
| 3,682,653 | 8/1972 | Mommer . |
| 3,806,613 | 4/1974 | Carroll et al. ........................ 426 |

FOREIGN PATENT DOCUMENTS

| | | |
|---|---|---|
| 158978 | 7/1972 | New Zealand . |
| 190505 | 3/1982 | New Zealand . |
| 261336 | of 1970 | U.S.S.R. . |
| 727249 | 3/1955 | United Kingdom . |

OTHER PUBLICATIONS

Barre et al., Some Engineering Phases of Grain Stora Agricultural Engineering, Mar. 1942, pp. 79-82, 84.
Westley R. Patton, et al., Approved Practices in Fe( and Feeding 1977, pp. 11 (unnumbered), 12 and 1( Interstate Publishers: Danville, Ill.
Frank B. Morrison Feeds and Feeding 1959 pp. 84, 87 The Morrison Publishing Co.: Clinton, Iowa.
Frank B. Morrison Feeds and Feeding 1956 pp. 84– The Morrison Publishing Co.: Ithaca, N.Y.
Rudolph Seiden, The Handbook of Feedstuffs 1957 176, 178, Springer Publishing Co., Inc.: New York.
W. Ray Ewing Poultry Nutrition Fifth Edition (i vised) 1963 pp. 504-505, Ray Ewing Co. Publishe Pasadena, Calif.
Karl F. Mattil et al. Bailey's Industrial Oil and F Products 1964 p. 732 Interscience Publishers: N( York.
M. J. Wolf et al. Cereal Chemistry "Structure of t Mature Corn Kernel", Sep. 1952 pp. 321-382.
J. J. C. Hinton, Cereal Chemistry Resistance of t Testa to Entry of Water into the Wheat Kernel Ji 1955 pp. 296-306.
Dorothy Bradbury et al. Cereal Chemistry Structure the Mature Wheat Kernel Nov. 1956 pp. 329-360.

*Primary Examiner*—Joseph M. Golian

[57] ABSTRACT

A method for sorption of solids by the tissues of who seeds to enhance the available nutritional value of tl whole seeds, to provide nutritional requirements for ruminant feed, to provide new superimposed processe to make more effective present superimposed processe to provide innoculation with viable organisms, to pr( vide means to reduce explosion hazzards from gra dust, and other advantages accruing from encapsulatic of solids, the method comprising contacting the who seeds with a synergetic mixture of solid materials and a oleaginous vehicle and maintaining contact until tl synergetic mixture has been sorbed by the grain.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–42 are cancelled.

* * * * *